(12) United States Patent
Dong et al.

(10) Patent No.: US 12,405,885 B2
(45) Date of Patent: Sep. 2, 2025

(54) AVOIDANCE OF GARBAGE COLLECTION IN HIGH PERFORMANCE MEMORY MANAGEMENT SYSTEMS

(71) Applicant: INTEL CORPORATION, Santa Clara, CA (US)

(72) Inventors: Yao Zu Dong, Shanghai (CN); Qiming Shi, Shanghai (CN); Chao Xie, Shanghai (CN); Bin Yang, Shanghai (CN); Zhen Zhou, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/598,190

(22) PCT Filed: May 31, 2019

(86) PCT No.: PCT/CN2019/089503
§ 371 (c)(1),
(2) Date: Sep. 24, 2021

(87) PCT Pub. No.: WO2020/237621
PCT Pub. Date: Dec. 3, 2020

(65) Prior Publication Data
US 2022/0171704 A1    Jun. 2, 2022

(51) Int. Cl.
*G06F 12/02* (2006.01)
*G06F 9/50* (2006.01)
*G06F 9/54* (2006.01)

(52) U.S. Cl.
CPC ........ *G06F 12/0253* (2013.01); *G06F 9/5016* (2013.01); *G06F 9/5022* (2013.01);
(Continued)

(58) Field of Classification Search
None
See application file for complete search history.

(56) References Cited

U.S. PATENT DOCUMENTS 6,823,518 B1 * 11/2004 Bliss .................. G06F 9/451
717/125
6,842,853 B1 * 1/2005 Bush .................. G06F 9/461
712/228

(Continued)

FOREIGN PATENT DOCUMENTS

CN     1761949 A     4/2006
CN     108073520 A   5/2018
(Continued)

OTHER PUBLICATIONS

International Search Report and Written Opinion for International Patent Application No. PCT/CN2019/089503, mailed Feb. 28, 2020, 8 pages.

(Continued)

*Primary Examiner* — Rocio Del Mar Perez-Velez
*Assistant Examiner* — Marwan Ayash
(74) *Attorney, Agent, or Firm* — Hanley, Flight & Zimmerman, LLC

(57) ABSTRACT

Systems, apparatuses and methods may provide for technology that detects a creation of a thread, dedicates a memory region to objects associated with the thread, and conducts a reclamation of the memory region in response to a termination of the thread. In one example, the memory region is a heap region and the reclamation bypasses at least a pause phase and a copy phase of a garbage collection process with respect to the heap region.

24 Claims, 6 Drawing Sheets

(52) U.S. Cl.
    CPC ...... *G06F 9/544* (2013.01); *G06F 2212/1016* (2013.01); *G06F 2212/7205* (2013.01)

(56) References Cited

U.S. PATENT DOCUMENTS

| | | | |
|---|---|---|---|
| 7,945,911 B1* | 5/2011 | Garthwaite | G06F 9/4843 707/814 |
| 10,019,341 B2 | 7/2018 | Ma | |
| 2002/0049719 A1 | 4/2002 | Shiomi et al. | |
| 2004/0158589 A1 | 8/2004 | Liang et al. | |
| 2006/0074988 A1 | 4/2006 | Imanishi et al. | |
| 2006/0085433 A1* | 4/2006 | Bacon | G06F 12/0253 |
| 2007/0169042 A1* | 7/2007 | Janczewski | G06F 8/45 717/149 |
| 2008/0021939 A1* | 1/2008 | Dahlstedt | G06F 9/52 |
| 2009/0083509 A1* | 3/2009 | Johnson | G06F 12/0253 711/170 |
| 2011/0252216 A1* | 10/2011 | Ylonen | G06F 9/52 711/170 |

FOREIGN PATENT DOCUMENTS

| | | |
|---|---|---|
| JP | H04-142867 A | 5/1992 |
| JP | 2002-259146 A | 9/2002 |
| JP | 2004-078636 A | 3/2004 |
| JP | 2009037546 A | 2/2009 |
| JP | 2011134202 A | 7/2011 |
| WO | 2009040228 A1 | 4/2009 |
| WO | 2016097680 A1 | 6/2016 |
| WO | 2017053109 A1 | 3/2017 |
| WO | 2018152229 A1 | 8/2018 |

OTHER PUBLICATIONS

Ankit Bisht, "Stack vs Heap Memory Allocation", <geeksforgeeks.org/stack-vs-heap-memory-allocation/>, retrieved May 15, 2019, 4 pages.

Ahmed Hussein et al., "Impact of GC Design on Power and Performance for Android", SYSTOR, ACM, May 26, 2015, 12 pages, Haifa Israel.

Sangmin Lee, "Understanding Java Garbage Collection", <cubrid.org/blog/understanding-java-garbage-collection>, May 31, 2017, 15 pages.

F. Pizlo et al., "Real-Time Java Scoped Memory: Design Patterns and Semantics", Seventh IEEE International Symposium on Object-Oriented Real-Time Distributed Computing, May 2004, 10 pages, Vienna, Austria.

International Searching Authority, "International Preliminary Report on Patentability," issued in connection with International Patent Application No. PCT/CN2019/089503, issued on Nov. 16, 2021, 4 pages.

European Patent Office, "Extended European Search Report," issued in connection with European Patent Application No. 19931226.5, dated Dec. 7, 2022, 9 pages.

European Patent Office, "Communication Under Rule 71(3) EPC," issued in connection with European Patent Application No. 19931226.5, dated Apr. 17, 2024, 6 pages.

European Patent Office, "Decision to Grant a European Patent Pursuant to Article 97(1) EPC," issued in connection with European Patent Application No. 19931226.5, dated Aug. 16, 2024, 2 pages.

Japan Patent Office, "Search Report by Registered Search Organization," issued in connection with Japanese Patent Application No. 2021-563430, dated May 18, 2023, 40 pages. [With English Translation].

Japan Patent Office, "Notice of Reasons for Refusal," issued in connection with Japanese Patent Application No. 2021-563430, dated Jun. 20, 2023, 6 pages. [With English Translation].

Japan Patent Office, "Notice of Reasons for Refusal," issued in connection with Japanese Patent Application No. 2021-563430 dated Dec. 12, 2023, 6 pages. [With English Translation].

Japan Patent Office, "Decision of Refusal," issued in connection with Japanese Patent Application No. 2021-563430, dated May 28, 2024, 4 pages. [With English Translation].

Japan Patent Office, "Decision of Dismissal of Amendment," issued in connection with Japanese Patent Application No. 2021-563430, dated May 28, 2024, 5 pages. [With English Translation].

Japan Patent Office, "Reconsideration Report by Examiner before Appeal," issued in connection with Japanese Patent Application No. 2021-563430, dated Jan. 15, 2025, 4 pages. [With English Translation].

Japan Patent Office, "Notice of Reasons for Refusal," issued in connection with Japanese Patent Application No. 2021-563430, dated Jul. 10, 2025, 7 pages. [With English Translation].

* cited by examiner

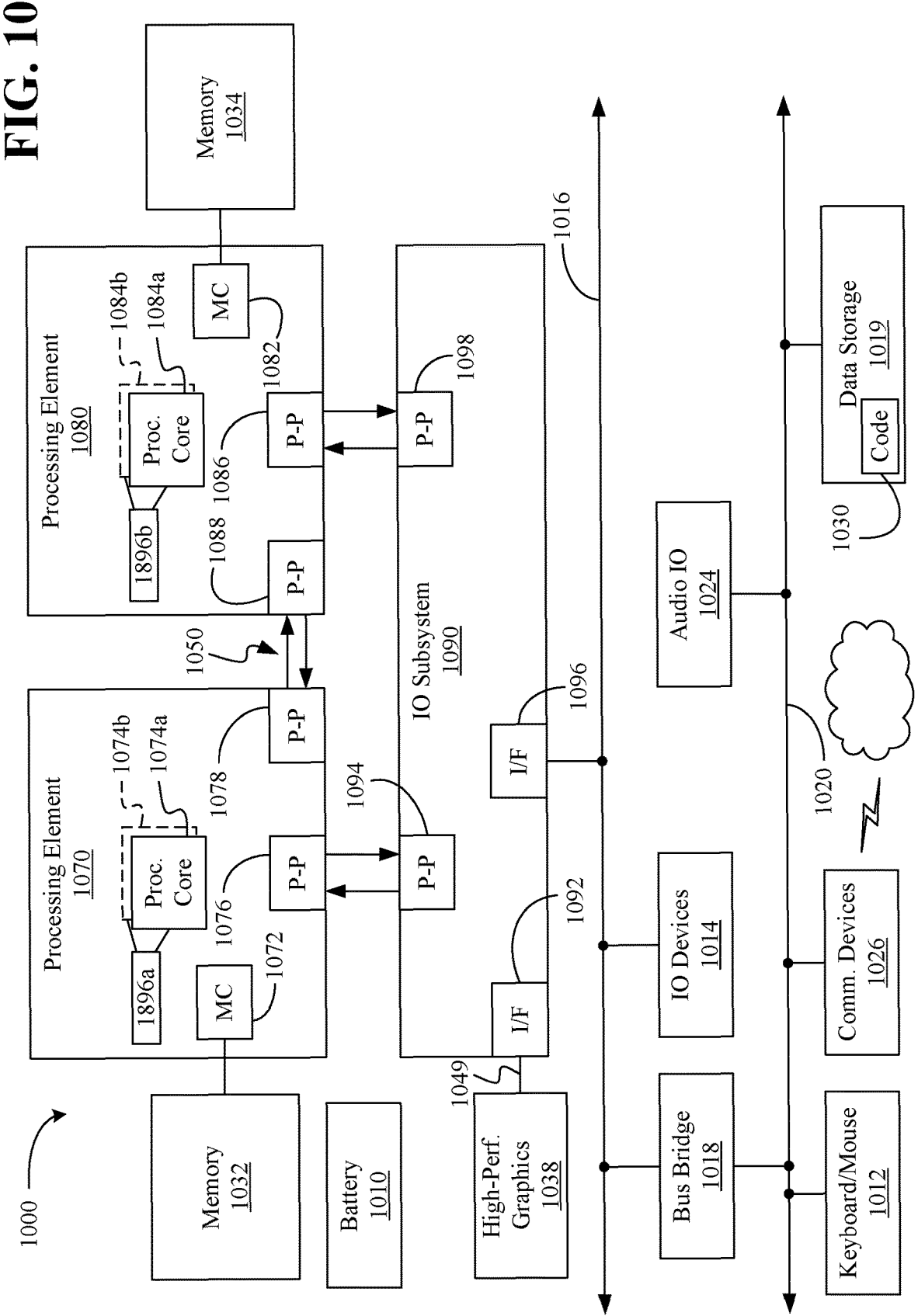

AVOIDANCE OF GARBAGE COLLECTION IN HIGH PERFORMANCE MEMORY MANAGEMENT SYSTEMS

CROSS REFERENCE TO RELATED APPLICATIONS

This application is a U.S. National Phase Patent Application which claims benefit to International Patent Application No. PCT/CN2019/089503 filed on May 31, 2019.

TECHNICAL FIELD

Embodiments generally relate to memory management in computing architectures. More particularly, embodiments relate to the avoidance of garbage collection in high performance memory management systems.

BACKGROUND

During operation, computer programs may allocate memory to various objects in order to perform operations involved in executing the programs. When computer programs fail to de-allocate memory from objects that are no longer used, available memory reduces unnecessarily, which may have a negative impact on performance and may lead to system failures (e.g., when no additional memory is available). While programs such as managed runtime applications may use "garbage collectors" to automatically reclaim memory that is no longer being used, there remains considerable room for improvement. For example, traditional garbage collectors may have a negative impact on performance in terms of processor usage, unpredicted pauses in user interfaces, additional power consumption (e.g., reduced battery life), and so forth.

BRIEF DESCRIPTION OF THE DRAWINGS

The various advantages of the embodiments will become apparent to one skilled in the art by reading the following specification and appended claims, and by referencing the following drawings, in which:

FIG. 10 is a block diagram of an example of a multi-processor based computing system according to an embodiment.

DESCRIPTION OF EMBODIMENTS

Figure 1:
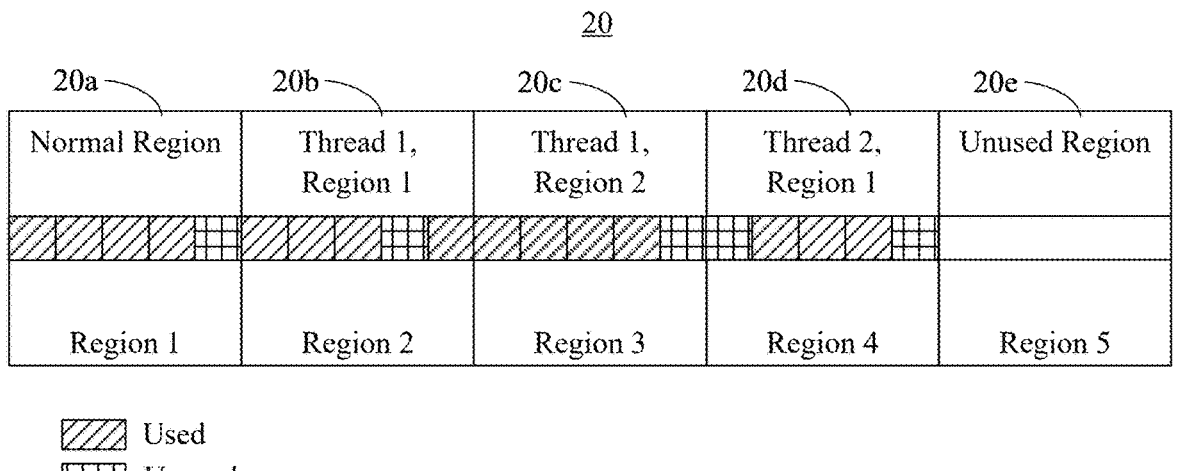
FIG. 1 is an illustration of an example of an allocation space after threads are created according to an embodiment.

Turning now to FIG. 1, an allocation space 20 (20a-20e) is shown after threads are created. In an embodiment, the allocation space 20 is part of a heap memory that is used to conduct dynamic memory allocation during run-time operation of a computer program that creates and terminates (e.g., destroys) threads. The heap memory may also include other memory space (not shown) such as, for example, large object space (e.g., storing relatively large primitive arrays and/or string arrays), image space (e.g., storing executable files, resource files, etc.), shared space (e.g., storing objects shared by multiple processes), non-moving space (e.g., storing long-lived objects), and so forth. In one example, the allocation space 20 stores relatively short-lived objects that might be targeted during a garbage collection process. Moreover, the threads may correspond to user interface activities that provide rich special effects and cause the short-lived objects to consume a relatively large amount of memory.

In the illustrated example, the allocation space 20 includes a first region 20a ("Region 1"), a second region 20b ("Region 2"), a third region 20c ("Region 3"), a fourth region 20d ("Region 4"), and a fifth region 20e ("Region 5"). The number of regions shown is for discussion purposes only and may vary depending on the circumstances. Regions of the illustrated allocation space 20 are individually dedicated to specific threads and/or activities. For example, the second region 20b and the third region 20c may be dedicated to a first thread ("Thread 1"), the fourth region 20d might be dedicated to a second thread ("Thread 2"), and so forth. In an embodiment, the objects in the second region 20b and the third region 20c may be shared between functions associated with the first thread without conducting extra copy operations. Similarly, the objects in the fourth region 20d may be shared between functions associated with the second thread without conducting extra copy operations. As will be discussed in greater detail, the illustrated solution enables performance to be enhanced.

Figure 2:
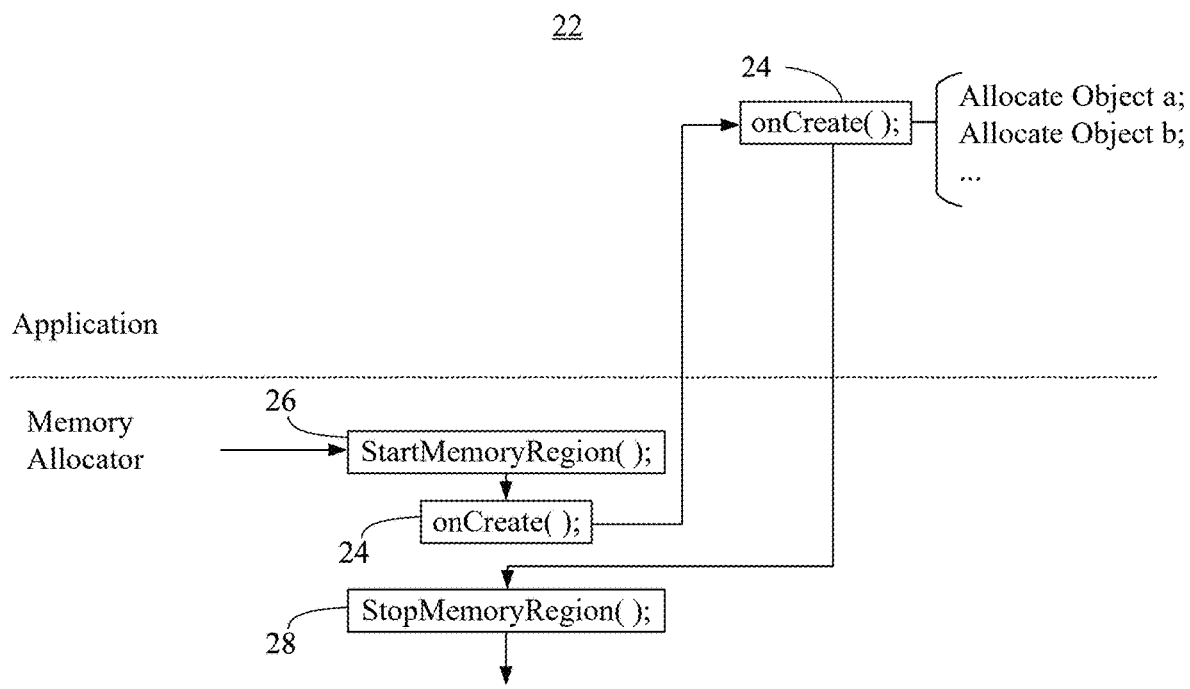
FIG. 2 is a flow diagram of an example of a dedication of a memory region to objects associated with a thread according to an embodiment.

FIG. 2 shows a flow diagram 22 in which a memory allocator (e.g., framework layer runtime manager) detects a function 24 (callback method "onCreate( )") that will create a new thread. In the illustrated example, the memory allocator triggers the dedication of a memory region to the thread by issuing a first command 26 ("StartMemoryRegion( )"). When the application calls the function 24, all objects (e.g., "Object a", "Object b") associated with the new thread will be allocated to the dedicated memory region. In addition to calling the function 24, the memory allocator may set a flag in the calling thread object to activate thread based allocation. In an embodiment, the memory allocator also maps the thread to the dedicated memory region. Table I below shows an example of such a mapping.

TABLE I

| UI Thread ID | Region |
| --- | --- |
| 3 | Region 2, Region 3 |
| 4 | Region 4 |

When the function 24 is done allocating objects, the illustrated memory allocator issues a second command 28 ("StopMemoryRegion( )") to discontinue dedicating objects to the memory region in question. The memory allocator may also clear the flag in the calling thread object to deactivate the thread based allocation in response to the termination of the thread. In an embodiment, the memory allocator also clears the appropriate thread-to-region table mapping entries. An example of pseudocode to implement the first command 26 and the second command 28 is shown below.

```
StartMemoryRegion( ) {
    threadId = GetThreadId( );
    SetActivityModeAllocate(threadId);
    regionId = AllocateNewRegion( );
    Record in the table with threadId and regionId;
}
StopMemoryRegion( ) {
    threadId = GetThreadId( );
    UnsetActivityModeAllocate(threadId);
}
```

If the size of the selected region is insufficient, an additional unused region may be dedicated to the objects associated with the thread. In an embodiment, the memory allocator checks whether the thread is under thread allocation mode. If not, the memory allocator may switch to a normal allocation mode. Otherwise, the memory allocator searches the table to find the specific region identifier and attempts to allocate the object in the designated region. If the region is full, the memory allocator may allocate another region for the thread and update the table correspondingly. An example of pseudocode to implement the selection of an additional region is shown below.

```
AllocateObject( ) {
    threadId = GetThreadId( );
    checkActivityMode(threadId);
    If not true:
        //Origin code path to allocate objects else:
        regionid = FindRegionID(threadid);
        AllocateObject(regionid);
        If not enough space:
            newRegionId = AllocateNewRegion( );
            Update the newRegionId to the table
            AllocateObject(newRegionid);
}
```

Figure 3:
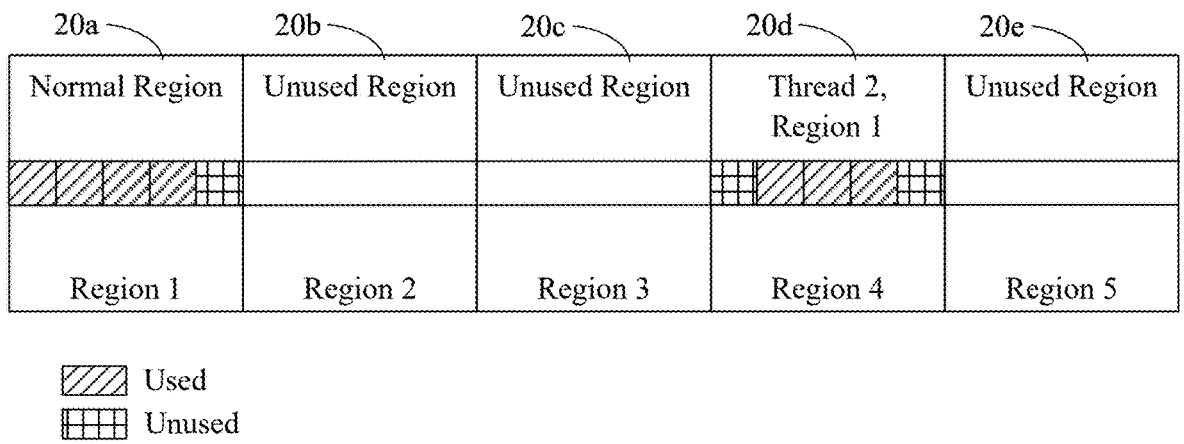
FIG. 3 is an illustration of an example of an allocation space after a memory reclamation according to an embodiment.

With continuing reference to FIGS. 1 and 3, termination of a thread may trigger a reclamation of all regions dedicated to the thread. For example, the termination of Thread 1 results in all objects in the second region 20b and the third region 20c being reclaimed. In an embodiment, the termination of the thread is detected based on high level (e.g., upper layer) information from the application. Of particular note is that garbage collector (GC) operations such as a pause phase in which all other threads are paused (e.g., to permit the GC to collect a root object set and determine which regions are to be reclaimed), may be bypassed. Other GC operations such as a copy phase in which the GC scans all living objects starting from the root set and copies those objects to an unused region (e.g., destination region), are also bypassed in the illustrated solution. Indeed, if the thread produces only short-lived objects, the frequency of executing GC operations may approach zero. Accordingly, performance is enhanced in terms of processor usage, unpredicted pauses in user interfaces, additional power consumption (e.g., reduced battery life), and so forth.

Figure 4:
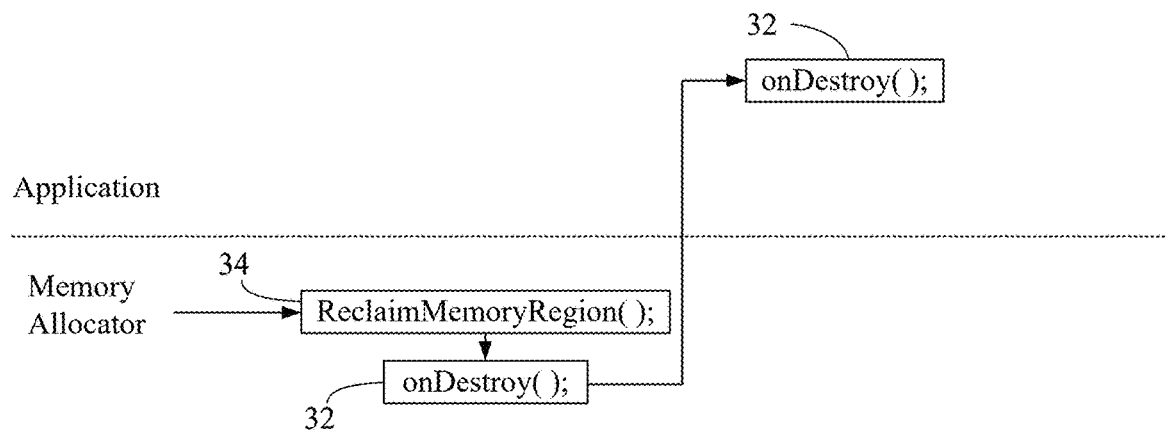
FIG. 4 is a flow diagram of an example of a memory reclamation according to an embodiment.

FIG. 4 shows a flow diagram 33 in which the memory allocator detects a function 32 (callback method "onDestroy( )") that will terminate an existing thread. In an embodiment, the function 32 results from too many applications running in the background, the application being closed and removed from an active application list, and so forth. In the illustrated example, the memory allocator triggers the reclamation of one or more memory regions that are dedicated to the thread by issuing a command 34 ("ReclaimMemoryRegion( )"). When the application calls the function 32, all memory regions that are dedicated to the thread will be reclaimed. In an embodiment, the memory allocator locates the selected regions for the thread by searching a table such as, for example, Table I for the appropriate thread identifier. The regions may be reclaimed one at a time. An example of pseudocode to implement the command 34 is shown below.

```
ReclaimMemoryRegion( ) {
    threadid = GetThreadId( );
    allRegionIds = FindAllRegionIDs(threadid);
    For each id in allRegionIds:
        FreeRegion(id);
}
```

Figure 5:
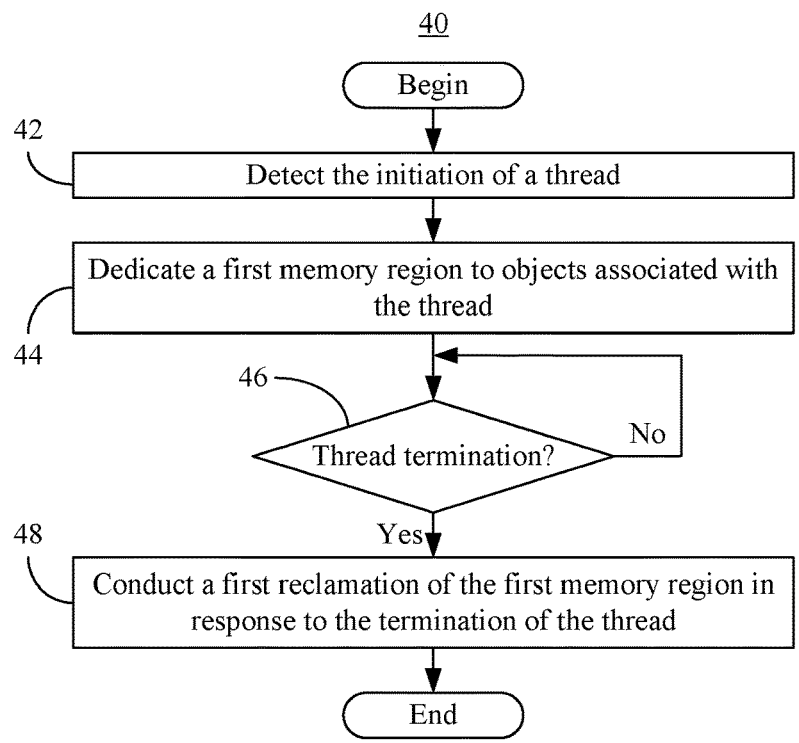
FIGS. 5 and 6 are flowcharts of examples of methods of managing memory according to an embodiment.

FIG. 5 shows a method 40 of managing memory. The method 40 may generally be implemented in a memory allocator such as, for example, the aforementioned memory allocator (FIG. 1). More particularly, the method 40 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 40 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 42 detects the initiation of a thread, where a first memory region is dedicated to objects associated with the thread at block 44. In an embodiment, block 44 includes activating thread based allocation and mapping the thread to the first memory region. A determination may be made at block 46 as to whether a termination of the thread has been initiated. If not, the illustrated method 40 repeats block 46. Of particular note is that the objects associated with the same thread are expected to have a similar lifecycle. Accordingly, upon detection of the thread termination, block 48 conducts a first reclamation of the first memory region in response to termination of the thread. In an embodiment, the method 40 further includes deactivating thread based allocation in response to the termination of the thread and unmapping the thread from the first memory region. In one example, the first memory region is a heap region and the first reclamation bypasses a pause phase and a copy phase of a garbage collection process with respect to the heap region. Additionally, the thread may correspond to a user interface (UI) activity. The method 40 may therefore enhance performance in terms of processor usage, unpredicted pauses in user interfaces, additional power consumption (e.g., reduced battery life), and so forth.

The illustrated method 40 may be used for native applications such as, for example, C or C++ applications, as well as for managed runtime applications having garbage collectors, which automatically reclaim memory that is no longer being used. The managed runtime applications may include, but are not limited to, for example, HTML5 (Hypertext Markup Language 5, e.g., HTML 5.2, W3C Recommendation, 14 Dec. 2017), JAVASCRIPT, C # (e.g., C #7.3, MICROSOFT Corp., May 7, 2018), Ruby (e.g., Ruby 2.6.3, Y. Matsumoto, Apr. 17, 2019), Perl (e.g., Perl 5.28.2, Perl.org, Apr. 19, 2019), Python (e.g., Python 3.7.3, Python Software Foundation, Mar. 25, 2019), JAVA (e.g., JAVA 10, ORACLE Corp., Mar. 20, 2018), etc.

Figure 6:
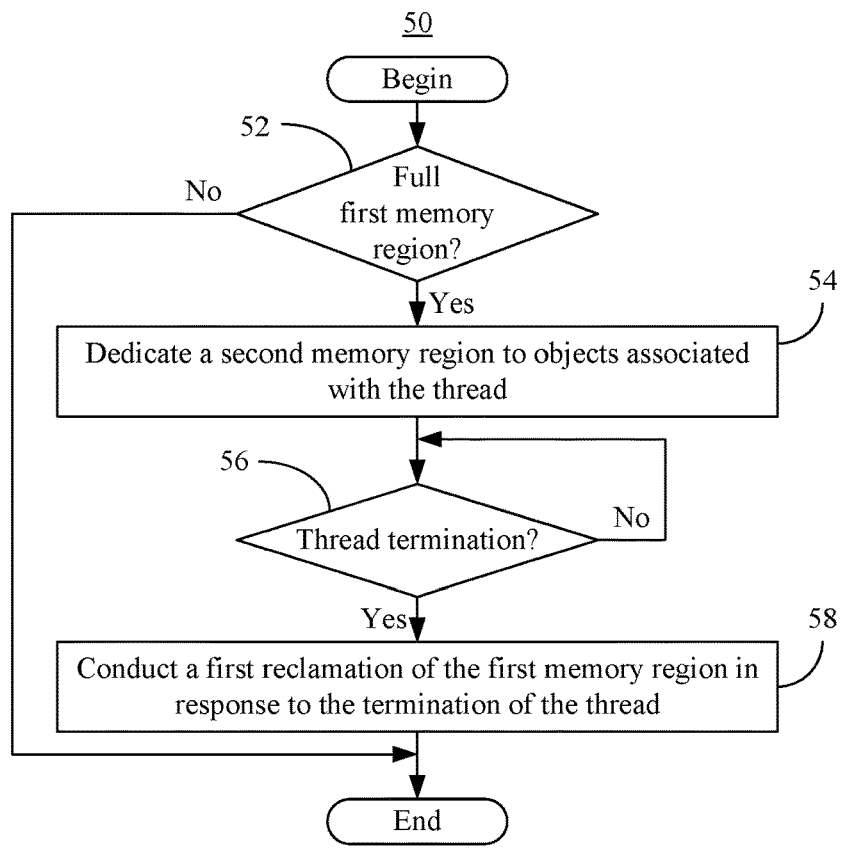

FIG. 6 shows another method 50 of managing memory. The method 50 may generally be implemented in a memory allocator such as, for example, the aforementioned memory allocator (FIG. 1). More particularly, the method 50 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 52 determines whether the first memory region is full. If so, a second memory region may be dedicated at block 54 to the objects associated with the thread. Additionally, a determination may be made at block 56 as to whether a termination of the thread has been initiated. If not, the illustrated method 50 repeats block 56. Upon detection of the thread termination, block 58 conducts a second reclamation of the second memory region in response to termination of the thread. Accordingly, the method 50 further enhances performance by supporting threads that allocate a relatively large number of objects (e.g., much larger than a stack, and therefore eliminating concerns over a stack overflow).

Figure 7:
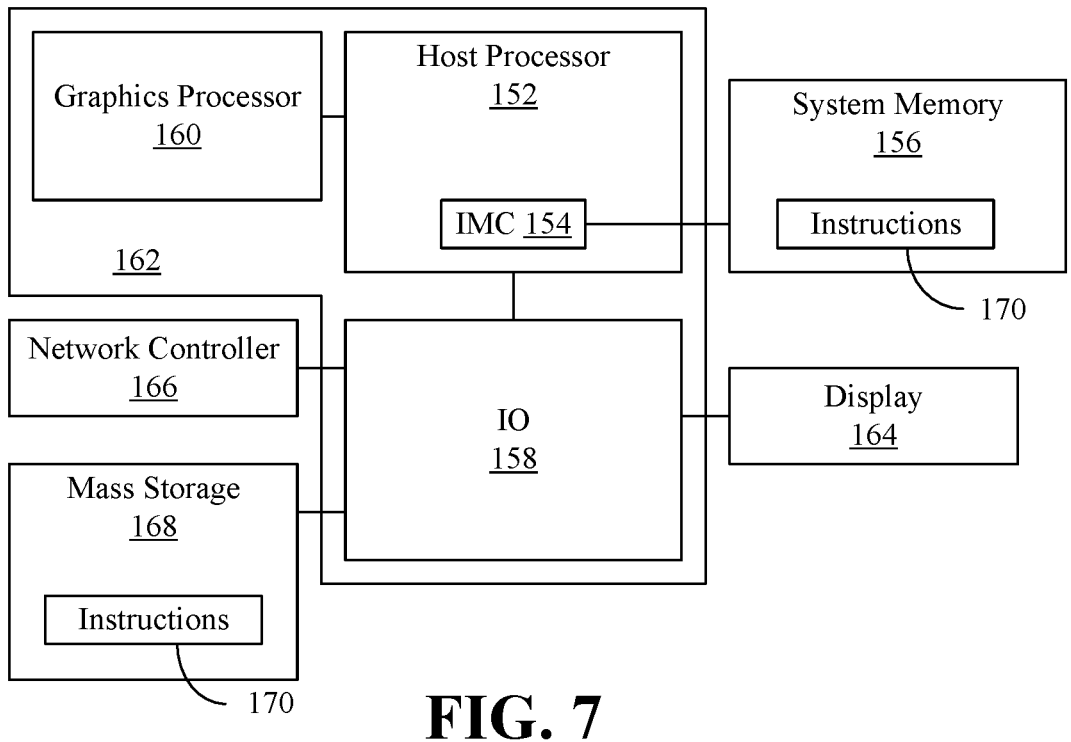
FIG. 7 is a block diagram of an example of a performance-enhanced computing system according to an embodiment.

Turning now to FIG. 7, a performance-enhanced computing system 150 is shown. The system 150 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 150 includes a host processor 152 (e.g., central processing unit/CPU) having an integrated memory controller (IMC) 154 that is coupled to a system memory 156.

The illustrated system 150 also includes an input output (IO) module 158 implemented together with the host processor 152 and a graphics processor 160 on a semiconductor die 162 as a system on chip (SoC). The illustrated IO module 158 communicates with, for example, a display 164 (e.g., touch screen, liquid crystal display/LCD, light emitting diode/LED display), a network controller 166 (e.g., wired and/or wireless NIC), and mass storage 168 (e.g., hard disk drive/HDD, optical disk, solid state drive/SSD, flash memory).

In an embodiment, the host processor 152 and/or the IO module 158 execute program instructions 170 retrieved from the system memory 156 and/or the mass storage 168 to perform one or more aspects of the method 40 (FIG. 5) and/or the method 50 (FIG. 6), already discussed. Thus, execution of the illustrated instructions 170 may cause the computing system 150 to detect a creation of a thread, dedicate a first memory region in the system memory 156 to objects associated with the thread, and conduct a first reclamation of the first memory region in response to a termination of the thread. In an embodiment, the first memory region is a heap region and the first reclamation bypasses at least a pause phase and a copy phase of a garbage collection process with respect to the heap region. Additionally, the thread may correspond to a UI activity (e.g., of a high performance game application) that causes the objects to be short-lived and to consume a relatively large amount of the system memory 156. In such a case the illustrated display 164 visually presents information associated with the UI activity.

As already noted, GC operations such as a pause phase in which all other threads are paused (e.g., to permit the GC to collect the root object set and determine which regions are to be reclaimed), may be bypassed. Other GC operations such as a copy phase in which the GC scans all living objects starting from the root set and copies those objects to an unused region (e.g., destination region), are also bypassed in the illustrated solution. Accordingly, the performance of the computing system 150 is enhanced in terms of processor usage, unpredicted pauses in user interfaces, additional power consumption (e.g., reduced battery life), and so forth.

Figure 8:
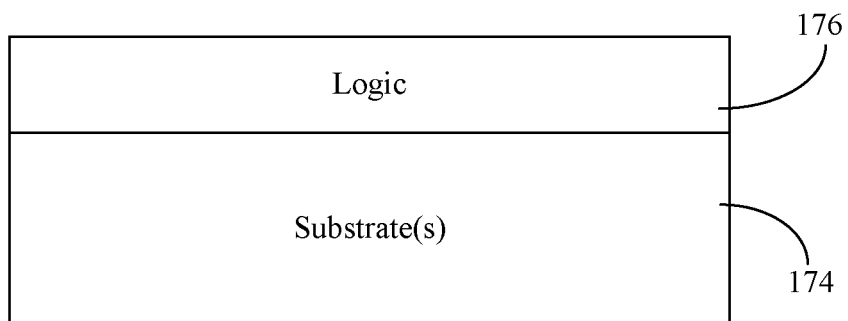
FIG. 8 is an illustration of an example of a semiconductor package apparatus according to an embodiment.

FIG. 8 shows a semiconductor apparatus 172 (e.g., chip, die, package). The illustrated apparatus 172 includes one or more substrates 174 (e.g., silicon, sapphire, gallium arsenide) and logic 176 (e.g., transistor array and other integrated circuit/IC components) coupled to the substrate(s) 174. In an embodiment, the logic 176 implements one or more aspects of method 40 (FIG. 5) and/or the method 50 (FIG. 6), already discussed. Thus, the logic 176 may detect a creation of a thread, dedicate a first memory region to objects associated with the thread, and conduct a first reclamation of the first memory region in response to a termination of the thread. In an embodiment, the first memory region is a heap region and the first reclamation bypasses (e.g., avoids) at least a pause phase and a copy phase of a garbage collection process with respect to the heap region. The performance of the apparatus 172 is therefore enhanced in terms of processor usage, unpredicted pauses in user interfaces, additional power consumption (e.g., reduced battery life), and so forth.

The logic 176 may be implemented at least partly in configurable logic or fixed-functionality hardware logic. In one example, the logic 176 includes transistor channel regions that are positioned (e.g., embedded) within the substrate(s) 174. Thus, the interface between the logic 176 and the substrate(s) 174 may not be an abrupt junction. The logic 176 may also be considered to include an epitaxial layer that is grown on an initial wafer of the substrate(s) 174.

Figure 9:
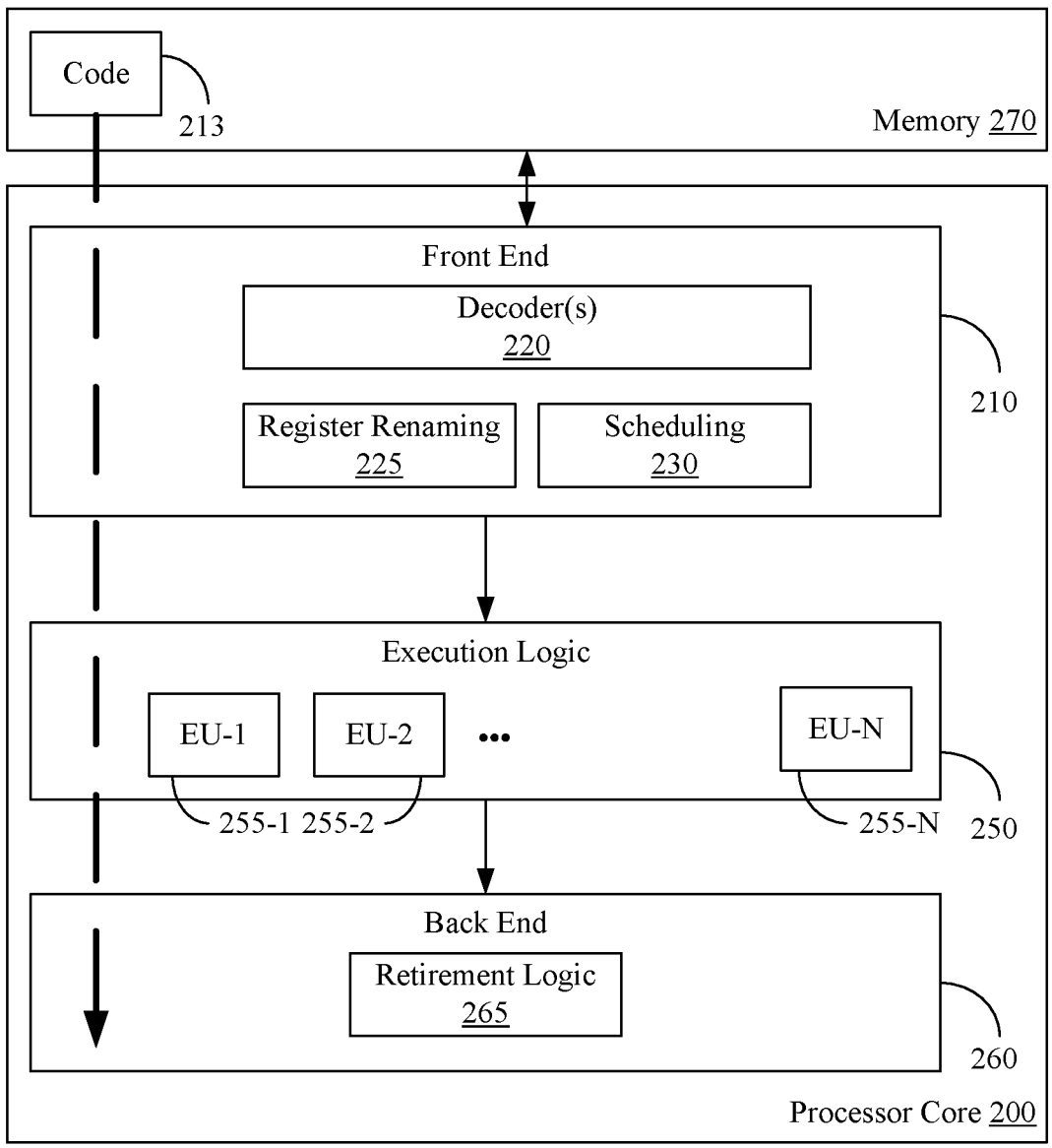
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement method 40 (FIG. 5) and/or the method 50 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 9.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 40 (FIG. 5) and/or the method 50 (FIG. 6), already discussed, and may be similar to the code 213 (FIG. 9), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a performance-enhanced computing system comprising a display, a processor coupled to the display, and a memory coupled to the processor, the memory including a set of executable program instructions, which when executed by the processor, cause the computing system to detect a creation of a thread, dedicate a first memory region to objects associated with the thread, and conduct a first reclamation of the first memory region in response to a termination of the thread.

Example 2 includes the computing system of Example 1, wherein the first memory region is a heap region and the first reclamation is to bypass a pause phase and a copy phase of a garbage collection process with respect to the heap region.

Example 3 includes the computing system of Example 1, wherein to dedicate the first memory region to the objects associated with the thread, the executable program instructions, when executed, cause the computing system to activate thread based allocation, and map the thread to the first memory region.

Example 4 includes the computing system of Example 3, wherein the executable program instructions, when executed, cause the computing system to deactivate the thread based allocation in response to the termination of the thread, and unmap the thread from the first memory region.

Example 5 includes the computing system of Example 1, wherein the executable program instructions, when executed, cause the computing system to dedicate a second memory region to the objects associated with the thread in response to a determination that the first memory region is full, and conduct a second reclamation of the second memory region in response to the termination of the thread.

Example 6 includes the computing system of any one of Examples 1 to 5, wherein the thread is to correspond to a user interface activity, and wherein the display is to visually present information associated with the user interface activity.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to detect a creation of a thread, dedicate a first memory region to objects associated with the thread, and conduct a first reclamation of the first memory region in response to a termination of the thread.

Example 8 includes the apparatus of Example 7, wherein the first memory region is a heap region and the first reclamation is to bypass a pause phase and a copy phase of a garbage collection process with respect to the heap region.

Example 9 includes the apparatus of Example 7, wherein to dedicate the first memory region to the objects associated with the thread, the logic coupled to the one or more substrates is to activate thread based allocation, and map the thread to the first memory region.

Example 10 includes the apparatus of Example 9, wherein the logic coupled to the one or more substrates is to deactivate the thread based allocation in response to the termination of the thread, and unmap the thread from the first memory region.

Example 11 includes the apparatus of Example 7, wherein the logic coupled to the one or more substrates is to dedicate a second memory region to the objects associated with the thread in response to a determination that the first memory region is full, and conduct a second reclamation of the second memory region in response to the termination of the thread.

Example 12 includes the apparatus of any one of Examples 7 to 11, wherein the thread is to correspond to a user interface activity.

Example 13 includes at least one computer readable storage medium comprising a set of executable program instructions, which when executed by a computing system, cause the computing system to detect a creation of a thread, dedicate a first memory region to objects associated with the thread, and conduct a first reclamation of the first memory region in response to a termination of the thread.

Example 14 includes the at least one computer readable storage medium of Example 13, wherein the first memory region is a heap region and the first reclamation is to bypass a pause phase and a copy phase of a garbage collection process with respect to the heap region.

Example 15 includes the at least one computer readable storage medium of Example 13, wherein to dedicate the first memory region to the objects associated with the thread, the executable program instructions, when executed, cause the computing system to activate thread based allocation, and map the thread to the first memory region.

Example 16 includes the at least one computer readable storage medium of Example 15, wherein the executable program instructions, when executed, cause the computing system to deactivate the thread based allocation in response to the termination of the thread, and unmap the thread from the first memory region.

Example 17 includes the at least one computer readable storage medium of Example 13, wherein the executable program instructions, when executed, cause the computing system to dedicate a second memory region to the objects associated with the thread in response to a determination that the first memory region is full, and conduct a second reclamation of the second memory region in response to the termination of the thread.

Example 18 includes the at least one computer readable storage medium of any one of Examples 13 to 17, wherein the thread is to correspond to a user interface activity.

Example 19 includes a method comprising detecting a creation of a thread, dedicating a first memory region to objects associated with the thread, and conducting a first reclamation of the first memory region in response to a termination of the thread.

Example 20 includes the method of Example 19, wherein the first memory region is a heap region and the first reclamation bypasses a pause phase and a copy phase of a garbage collection process with respect to the heap region.

Example 21 includes the method of Example 19, wherein dedicating the first memory region to the objects associated with the thread includes activating thread based allocation, and mapping the thread to the first memory region.

Example 22 includes the method of Example 21, further including deactivating the thread based allocation in response to the termination of the thread, and unmapping the thread from the first memory region.

Example 23 includes the method of Example 19, further including dedicating a second memory region to the objects associated with the thread in response to a determination that the first memory region is full, and conducting a second reclamation of the second memory region in response to the termination of the thread.

Example 24 includes the method of any one of Examples 19 to 23, wherein the thread corresponds to a user interface activity.

Thus, technology described herein packs an activity and the objects created by the activity into a single object bundle and reclaims memory consumed by the objects all at once (e.g., and without invoking a GC thread). The technology may apply to any language and may focus on the reclamation of all objects sharing a similar lifetime. Moreover, the technology may not place any additional burden on application developers (e.g., all modifications may be made in the managed runtime framework layer). The technology is also transparent to users (e.g., no negative impact on the user experience) and supports the sharing of objects between functions without extra copying operations (e.g., as in threaded memory allocators and/or resource allocation is initialization/RAII solutions).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A performance-enhanced computing system comprising:
    a display;
    a processor coupled to the display; and
    a memory coupled to the processor, the memory including a set of executable program instructions, which when executed by the processor, cause the computing system to:
        detect a creation of a first thread,
        activate thread based allocation for the first thread based on the first thread being associated with user interface activity,
        switch to a normal allocation mode from the thread based allocation for a third thread based on the third thread not being associated with the user interface activity,
        dedicate a first memory region to objects associated with only the first thread to bypass a storage of objects associated with a second thread into the first memory region based on the thread based allocation being activated for the first thread,
        dedicate a second memory region to the objects associated with the second thread,
        execute the normal allocation mode for objects associated with the third thread to store the objects of the third thread in a shared space based on the third thread being switched to the normal allocation mode, and conduct a first reclamation of the first memory region in response to a termination of the first thread.

2. The computing system of claim 1, wherein the first memory region is a heap region and the first reclamation is to bypass a pause phase and a copy phase of a garbage collection process with respect to the heap region.

3. The computing system of claim 1, wherein to dedicate the first memory region to the objects associated with the first thread, the executable program instructions, when executed, cause the computing system to:
map the first thread to the first memory region.

4. The computing system of claim 3, wherein the executable program instructions, when executed, cause the computing system to:
deactivate the thread based allocation in response to the termination of the first thread; and
unmap the first thread from the first memory region.

5. The computing system of claim 1, wherein the executable program instructions, when executed, cause the computing system to:
dedicate a third memory region to the objects associated with the first thread in response to a determination that the first memory region is full; and
conduct a second reclamation of the third memory region in response to the termination of the first thread.

6. The computing system of claim 1, wherein the first and second threads are to correspond to the user interface activity, and wherein the display is to visually present information associated with the user interface activity.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
detect a creation of a first thread;
activate thread based allocation for the first thread based on the first thread being associated with user interface activity;
switch to a normal allocation mode from the thread based allocation for a third thread based on the third thread not being associated with the user interface activity;
dedicate a first memory region to objects associated with only the first thread to bypass a storage of objects associated with a second thread into the first memory region based on the thread based allocation being activated for the first thread;
dedicate a second memory region to the objects associated with the second thread;
execute the normal allocation mode for objects associated with the third thread to store the objects of the third thread in a shared space based on the third thread being switched to the normal allocation mode; and
conduct a first reclamation of the first memory region in response to a termination of the first thread.

8. The apparatus of claim 7, wherein the first memory region is a heap region and the first reclamation is to bypass a pause phase and a copy phase of a garbage collection process with respect to the heap region.

9. The apparatus of claim 7, wherein to dedicate the first memory region to the objects associated with the first thread, the logic coupled to the one or more substrates is to:
map the first thread to the first memory region.

10. The apparatus of claim 9, wherein the logic coupled to the one or more substrates is to:
deactivate the thread based allocation in response to the termination of the first thread; and
unmap the first thread from the first memory region.

11. The apparatus of claim 7, wherein the logic coupled to the one or more substrates is to:
dedicate a third memory region to the objects associated with the first thread in response to a determination that the first memory region is full; and
conduct a second reclamation of the third memory region in response to the termination of the first thread.

12. The apparatus of claim 7, wherein the first and second threads are to correspond to the user interface activity.

13. At least one non-transitory computer readable storage medium comprising a set of executable program instructions, which when executed by a computing system, cause the computing system to:
detect a creation of a first thread;
activate thread based allocation for the first thread based on the first thread being associated with user interface activity;
switch to a normal allocation mode from the thread based allocation for a third thread based on the third thread not being associated with the user interface activity;
dedicate a first memory region to objects associated with only the first thread to bypass a storage of objects associated with a second thread into the first memory region based on the thread based allocation being activated for the first thread;
dedicate a second memory region to the objects associated with the second thread;
execute the normal allocation mode for objects associated with the third thread to store the objects of the third thread in a shared space based on the third thread being switched to the normal allocation mode; and
conduct a first reclamation of the first memory region in response to a termination of the first thread.

14. The at least one non-transitory computer readable storage medium of claim 13, wherein the first memory region is a heap region and the first reclamation is to bypass a pause phase and a copy phase of a garbage collection process with respect to the heap region.

15. The at least one non-transitory computer readable storage medium of claim 13, wherein to dedicate the first memory region to the objects associated with the first thread, the executable program instructions, when executed, cause the computing system to:
map the first thread to the first memory region.

16. The at least one non-transitory computer readable storage medium of claim 15, wherein the executable program instructions, when executed, cause the computing system to:
deactivate the thread based allocation in response to the termination of the first thread; and
unmap the first thread from the first memory region.

17. The at least one non-transitory computer readable storage medium of claim 13, wherein the executable program instructions, when executed, cause the computing system to:
dedicate a third memory region to the objects associated with the first thread in response to a determination that the first memory region is full; and
conduct a second reclamation of the third memory region in response to the termination of the first thread.

18. The at least one non-transitory computer readable storage medium of claim 13, wherein the first and second threads are to correspond to the user interface activity.

19. A method comprising:
detecting a creation of a first thread;

activating thread based allocation for the first thread based on the first thread being associated with user interface activity;

switching to a normal allocation mode from the thread based allocation for a third thread based on the third thread not being associated with the user interface activity;

dedicating a first memory region to objects associated only with the first thread to bypass a storage of objects associated with a second thread into the first memory region based on the thread based allocation being activated for the first thread;

dedicating a second memory region to the objects associated with the second thread;

executing the normal allocation mode for objects associated with the third thread to store the objects of the third thread in a shared space based on the third thread being switched to the normal allocation mode; and conducting a first reclamation of the first memory region in response to a termination of the first thread.

20. The method of claim 19, wherein the first memory region is a heap region and the first reclamation bypasses a pause phase and a copy phase of a garbage collection process with respect to the heap region.

21. The method of claim 19, wherein dedicating the first memory region to the objects associated with the first thread includes:

mapping the first thread to the first memory region.

22. The method of claim 21, further including:

deactivating the thread based allocation in response to the termination of the first thread; and unmapping the first thread from the first memory region.

23. The method of claim 19, further including:

dedicating a third memory region to the objects associated with the first thread in response to a determination that the first memory region is full; and conducting a second reclamation of the third memory region in response to the termination of the first thread.

24. The method of claim 19, wherein the first and second threads correspond to the user interface activity.

* * * * *